April 12, 1927.
E. ABELT
1,624,197
DEVICE FOR CUTTING GLASS TUBES OR RODS
Filed Oct. 29, 1926
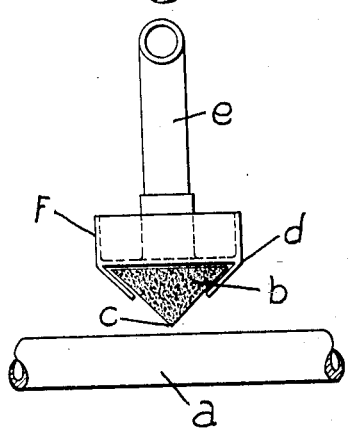
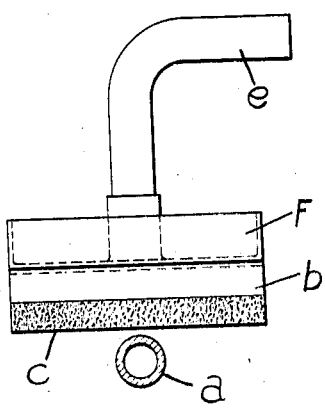
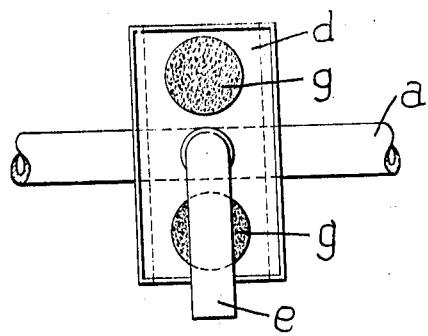

Patented Apr. 12, 1927.

1,624,197

UNITED STATES PATENT OFFICE.

ERNST ABELT, OF KARNAP, NEAR ESSEN-ON-THE-RUHR, GERMANY, ASSIGNOR TO THE LIBBEY GLASS COMPANY, OF TOLEDO, OHIO, A CORPORATION OF OHIO.

DEVICE FOR CUTTING GLASS TUBES OR RODS.

Application filed October 29, 1926, Serial No. 145,007, and in Germany March 10, 1926.

This invention relates to machines for automatically cutting into separate sections a continuously moving glass tube or rod, the cutting being effected by a suitable tool coming at intervals into contact with the glass.

The mechanism on which the cutting tool is mounted, because of its function, must of necessity be made very heavy, and after a comparatively short period of time begins to act on the tube or rod to be severed. Although it is intended that the cutting tool and the tube or rod be in a relative state of rest during the cutting operation, this is unavoidably not obtained. Instead, the cutting tool slides on the article to be severed so that the object does not receive one sharp cut, but is scratched in a direction longitudinal of the tube or rod. As a consequence, the cutting tool crushes the glass tube which splinters when being broken. The splintered ends not only constitute a loss of production, but also a considerable amount of waste, occurring when the tube or rod is further tested.

In accordance with this invention the above disadvantages are obviated. Preferably a cutting tool of a hard and porous material is provided which may be resiliently mounted and maintained in moist condition, as will hereinafter appear.

One manner of carrying out the invention is shown on the accompanying drawings, in which:

Fig. 1 is a front view of the cutting device; Fig. 2 is a side view; and Fig. 3 is a top plan view.

$a$ is a continuously produced article to be severed, in the present instance a glass tube, and $b$ denotes a cutting tool consisting of a hard and porous material provided with a cutting edge $c$, which runs at right angles to the longitudinal extent of the tube or rod. The cutting tool $b$ is mounted on a holder $d$ and is so grasped by the latter that the cutting edge $c$ projects freely from the holder. The holder is connected by means of an elastic arm $e$ with an element not shown, which is controlled in such manner that the tool comes into contact with the work piece at adjustable intervals. In case of tubes and rods of 10 mm. diameter and above, it is advisable to move the cutting tool and work piece in the same direction, and at the same speed during the cutting process; in other words, to produce a relative state of rest between the two.

The effect of the device is, however, so instantaneous that in case of thin and quickly drawn tubes with a high number of cuts, the to and fro movement may be dispensed with, whereby oscillating parts are not required for the machine, and the life and smooth running thereof is increased. In consequence of this, a greater number of cuts can be achieved than with the oscillating machine, and this results in a high production of the installation.

Since it has been found from experience that the relative state of rest between the tool and the work piece cannot be permanently maintained and in cases of tubes of smaller diameter the tool is stationary, the latter is connected by an elastic arm $e$ with the moving mechanism of the device not shown on the drawings. In all cases an actuation of the tool without the formation of scratches is insured.

It is advisable to use carborundum for a cutting instrument which is maintained moist in a suitable manner, and for this purpose the upper surface of the holder $d$ may be formed with openings $g$ through which means for moistening the stone is introduced, or it may be kept moist by a packing placed on the top surface and held thereon by means of side plates $f$.

The effect of the tool is twofold, namely a chilling and a scratching effect. Cutting is preferably carried out at a point where, through the overhanging of the free end of the rod or tube a tension is set up in a natural manner in the upper surface thereof.

While I have described my improved cutting device in more or less detail to comply with the requirements of the statute, it is, nevertheless, desired that this detailed description be considered merely as illustrative and not as limiting, and it is to be understood that changes and modifications may be made by those skilled in this art without departing from the invention, as defined in the following claims.

What I claim as new and desire to secure by Letters Patent is:

1. A device for automatically severing a continuously moving glass tube or rod into separate sections comprising a cutting tool of hard and porous material, means for resiliently mounting said tool, and means for keeping said tool moist.

2. A device for automatically severing a continuously moving glass tube or rod into separate sections comprising a carborundum cutting tool, elastic means for mounting said tool, and means for moistening said tool.

3. A device for automatically severing a continuously moving glass tube or rod into separate sections comprising a cutting tool of hard and porous material, means for resiliently mounting said tool, and means for keeping said tool moist, said tool being movable only in a direction vertical to the tube or rod for cutting it.

In testimony whereof I have hereunto signed my name to this specification.

ERNST ABELT.